United States Patent
Brady et al.

(10) Patent No.: US 11,523,051 B2
(45) Date of Patent: Dec. 6, 2022

(54) CO-BORESIGHTED MONOCENTRIC MULTISCALE (MMS) CAMERA EXHIBITING GALILEAN MULTISCALE DESIGN

(71) Applicants: Aqueti Incorporated, Durham, NC (US); Duke University, Durham, NC (US)

(72) Inventors: David Jones Brady, Durham, NC (US); Wubin Pang, Durham, NC (US)

(73) Assignees: Aqueti Incorporated, Durham, NC (US); Duke University, Durham, NC (US)

( * ) Notice: Subject to any disclaimer, the term of this patent is extended or adjusted under 35 U.S.C. 154(b) by 482 days.

(21) Appl. No.: 16/485,579

(22) PCT Filed: Feb. 13, 2018

(86) PCT No.: PCT/US2018/018008
§ 371 (c)(1),
(2) Date: Aug. 13, 2019

(87) PCT Pub. No.: WO2018/148730
PCT Pub. Date: Aug. 16, 2018

(65) Prior Publication Data
US 2020/0018933 A1    Jan. 16, 2020

Related U.S. Application Data

(60) Provisional application No. 62/458,116, filed on Feb. 13, 2017.

(51) Int. Cl.
*H04N 5/232* (2006.01)
*H04N 5/225* (2006.01)
(Continued)

(52) U.S. Cl.
CPC ....... *H04N 5/23227* (2018.08); *H04N 5/2254* (2013.01); *H04N 5/2258* (2013.01); *H04N 5/23238* (2013.01); *G02B 9/16* (2013.01); *G02B 13/005* (2013.01); *G02B 13/0055* (2013.01); *G03B 19/023* (2013.01); *G03B 27/10* (2013.01);
(Continued)

(58) Field of Classification Search
None
See application file for complete search history.

(56) References Cited

U.S. PATENT DOCUMENTS

| 4,331,390 A | 5/1982 | Shafer |
| 8,928,988 B1 * | 1/2015 | Ford ................... H04N 5/2258 359/664 |

(Continued)

OTHER PUBLICATIONS

Authorized Officer: Blaine R. Copenheaver, International Search Report and Written Opinion issued in PCT application No. PCT/US2018/018008, dated Apr. 24, 2018, 7 pp.

*Primary Examiner* — Eileen M Adams
(74) *Attorney, Agent, or Firm* — Kaplan Breyer Schwarz, LLP (57) ABSTRACT

Disclosed are systems, methods, and structures for monocentric multiscale gigapixel imaging systems and cameras employing a Galilean architecture wherein adjacent subimages do not overlap while advantageously producing a reduced system volume, improved relative illumination and image quality as compared with prior art systems.

4 Claims, 12 Drawing Sheets

(51) Int. Cl.
*G03B 19/02* (2021.01)
*H04N 13/218* (2018.01)
*G03B 27/10* (2006.01)
*G02B 13/00* (2006.01)
*G02B 9/16* (2006.01)

(52) U.S. Cl.
CPC ....... *H04N 5/22541* (2018.08); *H04N 13/218* (2018.05)

(56) References Cited

U.S. PATENT DOCUMENTS

| | | |
|---|---|---|
| 9,635,253 B2 | 4/2017 | Brady et al. |
| 2002/0054437 A1 | 5/2002 | Ishii et al. |
| 2006/0103924 A1 | 5/2006 | Katz |
| 2011/0211106 A1* | 9/2011 | Marks .................. G02B 13/006 348/340 |
| 2013/0027793 A1 | 1/2013 | Peterson et al. |
| 2013/0242060 A1 | 9/2013 | Brady et al. |
| 2015/0116553 A1 | 4/2015 | Ford et al. |
| 2015/0316768 A1* | 11/2015 | Simmonds ......... G02B 27/0103 345/32 |
| 2017/0289465 A1* | 10/2017 | Slonaker ............ H04N 5/23293 |

\* cited by examiner

CO-BORESIGHTED MONOCENTRIC MULTISCALE (MMS) CAMERA EXHIBITING GALILEAN MULTISCALE DESIGN

CROSS REFERENCE TO RELATED APPLICATION

This application claims the benefit of U.S. Provisional Application Ser. No. 62/458.116 filed 13 Feb. 2017.

TECHNICAL FIELD

This disclosure relates generally to optics and digital imaging and, more particularly, to large-pixel-count imaging systems.

BACKGROUND

As will be readily appreciated by those skilled in the art, digital imaging systems, methods, and structures are employed in an ever-increasing number of applications and have become integral in every industry imaginable—making, creating, storing, analyzing, and disseminating images.

Given this importance, improved systems, methods, and structures for digital imaging—and in particular—systems, methods and structures which facilitate the development of gigapixel imaging—would represent a welcome addition to the art.

SUMMARY

An advance is made in the art according to aspects of the present disclosure directed to systems, methods, and structures for monocentric multiscale gigapixel imaging systems and cameras employing a Galilean architecture wherein adjacent subimages do not overlap while advantageously producing a reduced system volume, improved relative illumination and image quality as compared with prior art systems.

In sharp contrast to prior art Kepler designs, systems, methods, and structures according to the present disclosure do not exhibit an image surface prior to secondary microcamera optics. Accordingly, designs according to the present disclosure exhibit a much smaller volume. In illustrative embodiments, "holes" in an overall image are eliminatated through the use of several co-boresighted cameras having complementary holes or by scanning the system.

In particular illustrative configurations, improved, smaller overall system volume may be as much as 10× smaller that prior art systems.

This SUMMARY is provided to briefly identify some aspect(s) of the present disclosure that are further described below in the DESCRIPTION. This SUMMARY is not intended to identify key or essential features of the present disclosure nor is it intended to limit the scope of any claims.

The term "aspect" is to be read as "at least one aspect". The aspects described above and other aspects of the present disclosure are illustrated by way of example(s) and not limited in the accompanying drawing.

BRIEF DESCRIPTION OF THE DRAWING

A more complete understanding of the present disclosure may be realized by reference to the accompanying drawing in which:

FIGS. 3(A) and 3(B) show schematic diagrams of illustrative HAMS optical systems according to aspects of the present disclosure in which: FIG. 3(A) illustrates a representative optical volume of such system while

FIGS. 4(A) and 4(B) show schematic diagrams of illustrative MMS optical imaging systems in which: FIG. 4(A) shows aperture size of a microcamera being inherently smaller than virtual intermediate image for Galilean design a tiny portion of a ray bundle travels through the aperture while most of the ray bundle is blocked leading to severe vignetting and a marginal FOV while

FIGS. 6(A) and 6(B) show schematic diagrams of illustrative optical systems in which: FIG. 6(A) shows an illustrative schematic Keplerian design while

FIGS. 7(A) and 7(B) show schematic diagrams of illustrative 3 channel optical systems in which: FIG. 7(A) shows an illustrative AWARE-2 design highlighting one lens configuration while FIG. 7(B) shows an illustrative schematic of a Gallerian MMS design according to an aspect of the present disclosure highlighting the configuration of the lens(es) employed;

FIGS. 8(A) and 8(B) show plots of modulation transfer functions for: FIG. 8(A) an illustrative MMS system according to aspects of the present disclosure and FIG. 8(B) the glass AWARE-2.

DETAILED DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not been shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

In addition, it will be appreciated by those skilled in art that certain methods according to the present disclosure may represent various processes which may be substantially represented in computer readable medium and so controlled and/or executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

By way of some additional background, we begin by noting that the demand for gigapixel-scale cameras and imaging systems has been steadily increasing given their recognized utility in a variety of applications including broadcast media, imaging, virtual reality, flight control, transportation management, security, and environmental monitoring,—among others. Notwithstanding this considerable demand, utilization of such gigapixel systems has been tempered due—in part—to the cost and system complexity of such gigapixel systems coupled with recognized computational and communications challenge(s) of gigapixel image management.

Given these infirmities, the art has directed considerable enthusiasm towards Monocentric Multiscale (MMS) imaging systems and cameras that may advantageously reduce the cost and complexity of gigapixel imaging systems due to several design and technology breakthroughs. Notably, and as will be readily appreciated by those skilled in the art, MMS imaging systems and cameras advantageously achieve both high angular resolution and a wide field of view (FOV) in gigapixel scale systems. In contrast with gigapixel astronomical telescopes and lithographic lenses, MMS imaging systems and cameras according to the present disclosure may advantageously be manufactured and assembled using commercially available, off-the-shelf components and methods, while the former may only can be realized in precisely controlled lab environment with purposely developed tools and materials.

We note that the architecture of an illustrative MMS system generally resembles that of a telescope. More particularly, one layered monocentric spherical objective lens is shared by several microcameras, wherein each microcamera covers a portion of an overall FOV—denoted as microcamera FOV (MFOV). We note further that refractive telescopes may be classified into Keplerian systems having an internal image surface and Galilean systems having secondary optics positioned before an objective focal surface. Yet while MMS systems may be designed according to either of these two classifications, and that Galilean systems achieve a smaller physical size, prior art MMS imaging systems and cameras all adopt Keplerian design(s) because such architectures more readily accommodate overlap between adjacent microcamera FOV and because they are easier to construct.

Of interest to the present disclosure, Galilean telescopes include a positive objective lens and a negative secondary, separated by a difference between their focal lengths. As compared to a Keplerian design, Galilean designs feature a shorter tube length and therefore smaller overall size. One recognized disadvantage of Galilean designs is their smaller FOV. As we shall show and describe, such disadvantage is overcome in MMS imaging systems and cameras according to the present disclosure since our approach achieves a wide(r) FOV by dividing it into a large array of small(er) FOVs.

Figure 1:
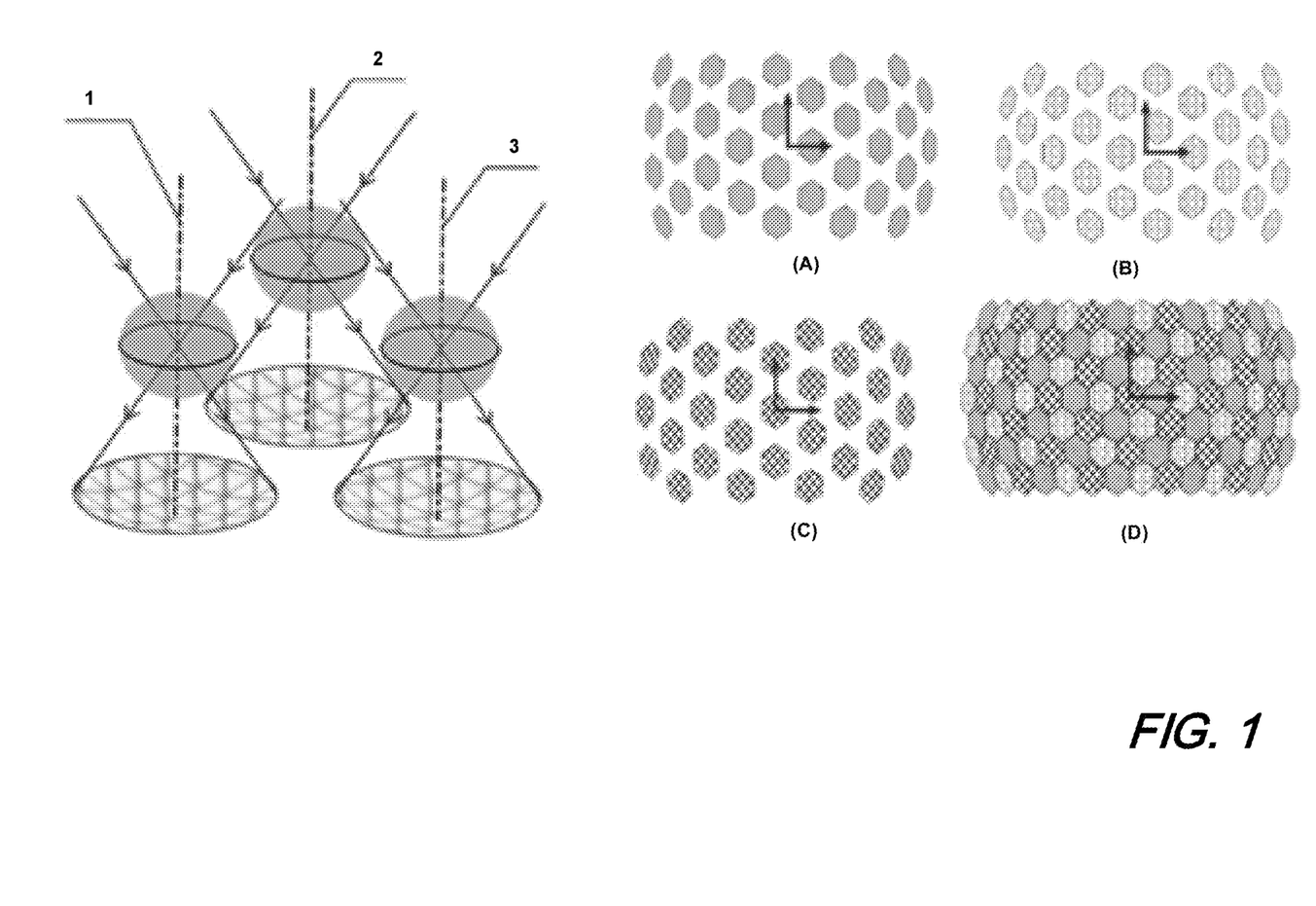
FIG. 1 shows a schematic diagram illustrating three co-boresighted MMS cameras paralleled together to achieve a seamless, continuous field of view according to an aspect of the present disclosure.

Turning now to FIG. 1, there is shown a schematic of an illustrative MMS imaging system according to the present disclosure in which three co-boresighted MMS cameras are paralleled together to cover a seamless continuous field of view. As illustratively depicted in that figure, microcameras of each MMS camera are arranged such that the three array patterns complement each other and compose a complete coverage of view. The three array patterns (patches) from the individual MMS cameras and the combined pattern is shown in the inset to the figure.

As may be observed from this figure, view coverage by each individual MMS camera is arranged in a regular, triangular, interleaved relationship relative to the other two individual MMS cameras and consequently, contributes one third of the entire FOV of the overall illustrative MMS imaging system. Operationally, a final, wide FOV panorama is obtained by "stitching" together the three sub-images that overlap on their periphery into an overall image. The benefits resulting from such an arrangement is at least three-fold.

First, by employing FOV interleaving, a physical cone angle of each individual microcamera unit is substantially larger than the FOV angle that one is required to process. In another words—while the MFOV remains constant, there is more room for a larger microcamera aperture size, which enables a Galilean design with all the benefits such design entails—without suffering from vignetting.

Second, by loosening the space budget for each individual microcamera, high(er) image quality—even with simpler lens(es) is advantageously achieved as we shall show and describe with respect to an illustrative design example. The cost can be reduced as a result of easier fabrication, assembly, mechanical support and focusing mechanism.

Finally, the physical size of each individual microcamera made smaller, thereby producing a more compact optical design. Note that if the physical dimension(s) of each individual microcamera is reduced by a factor of two—which we shall show and describe—the overall volume will be reduced by at least a factor of eight. Even with only three microcameras employed in an illustrative MMS imaging system, the overall volume of the imaging system may be reduced by about one third.

At this point it is worth noting that the above—as well as other—improvements may be achieved without sacrificing angular resolution as well as overall effective focal length. Those skilled in the art will notice that similar benefits may be obtained using a single MMS camera system employing pan and tilt functions over time to fill in holes in the overall image space. One may also choose to use a wide field low resolution camera in parallel with a Galilean MMS imaging system to fully capture the field at low resolution while panning and tilting the MMS system to fill in high resolution detail. Additional adaptive strategies for combining wide field low resolution and subsampled Galilean systems may also be considered.

Conventional MMS imaging systems and cameras such as those described in the art (AWARE) have addressed several limits with regards to system volume and image quality. Herein however, our discussion concerns issues exclusively related to optics.

Given a set of basic imaging system specifications namely:

Overall focal length: f;
Overall Field of View: FOV;
Angular resolution or instantaneous: iFOV;
Aperture size: F/#; and
Wavelength ranges: visible band (e.g., 450 nm-650 nm).

We then choose specifications of an optical detector that may be available namely:

Sensor active pixels: M×N assume M>N;
Pixel size: p; and
field of view of each single microcamera unit MFOV:

$$\alpha = \tan^{-1}\left(\frac{Np}{f}\right).$$

To avoid physical interference between adjacent microcameras, each microcamera unit is bounded by a physical cone angle θ. Moreover, to prevent an image gap, the FOVs of adjacent microcameras overlap each other. Consequently, the physical cone angle is smaller than MFOV, i.e. α>θ. As demonstrated in the earlier AWARE system, we stipulate that α=1.4θ to account for possible manufacture and alignment errors as allowed by tolerance limits.

Figure 2:
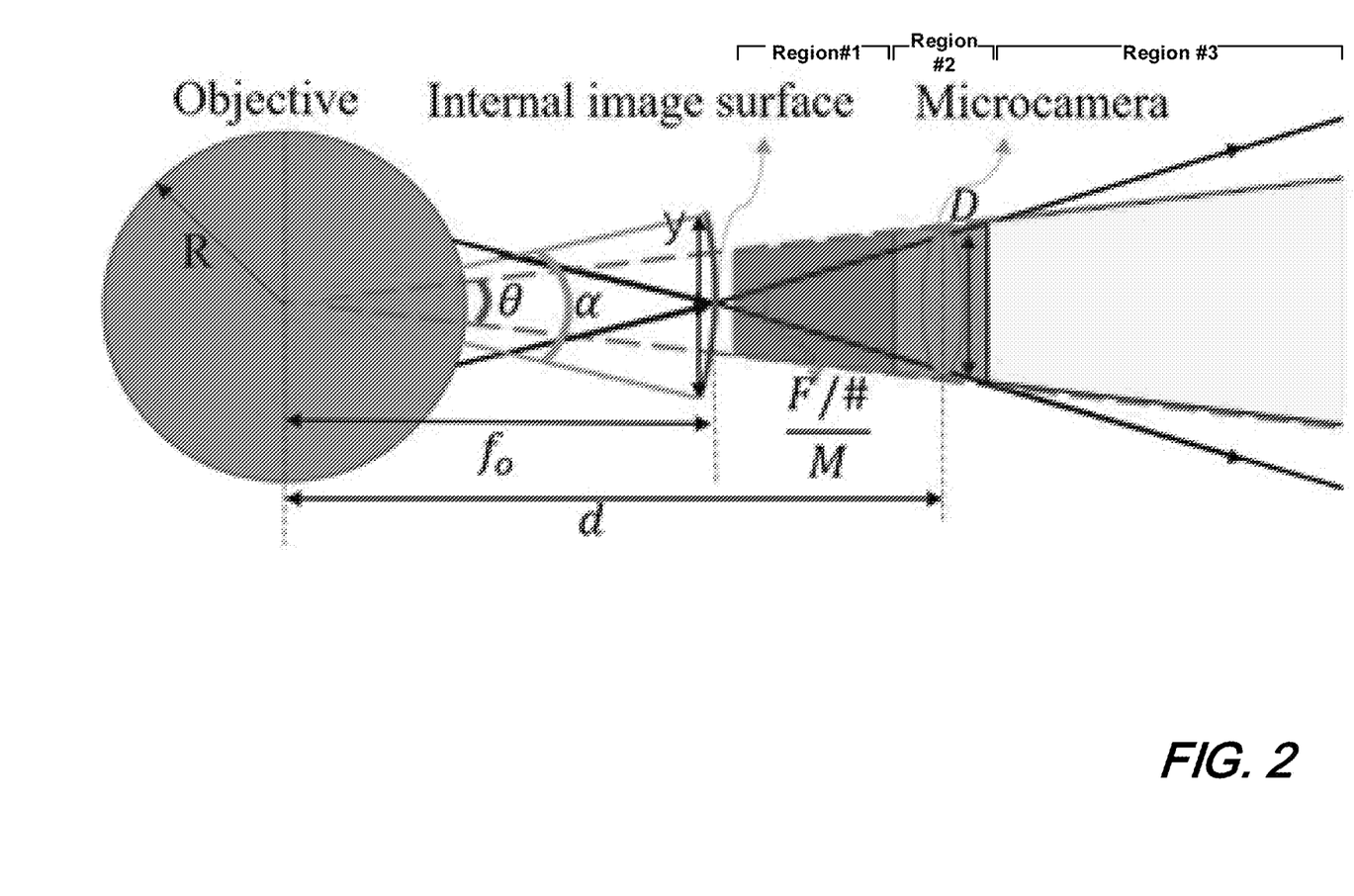
FIG. 2, there is shown a schematic diagram of an illustrative individual optical arrangement for an individual MMS according to aspects of the present disclosure.

Turning now to FIG. 2, there is shown a schematic of an illustrative optical arrangement for an individual MMS according to aspects of the present disclosure. As shown in that figure, the arrowed line represents marginal rays that determines the F/# of the imaging ray bundle. Dashed lines represent physical cone angle, inside of which there are shown three regions (Region #1, Region #2, and Region #3) in which the microcamera may optionally be positioned. Note that if a microcamera is positioned in region 41, a small aperture size, severe vignetting for the edge of MFOV, complex microcamera optics, short optical track and small system volume results. If the microcamera is positioned in region 43, vignetting for the center of MFOV, a simple lens exhibiting large aperture size and large system volume results. If, however, the microcamera is positioned in region #2—in between regions #1 and #3, such region may be viewed as a well-balanced region to position the microcamera.

By following the same argument(s) previously noted, we assume that an internal image surface size should be equal or smaller than the aperture size of the microcamera, i.e., y≤D. Using this assumption, we can derive a feasible range of transverse magnification M between final image and internal image. According to the geometry shown illustratively in FIG. 2, we may determine that the internal image size y and aperture size D are related to F/# and MFOV according to the following relationships:

$$D = \frac{f\alpha}{1.4\left(M - \frac{\alpha F/\#}{1.4}\right)} \quad (1)$$

$$y = f_0\alpha = \frac{f\alpha}{M} \quad (2)$$

Configurations in which y≤D, result in a feasible magnification as:

$$M \leq \frac{\alpha F/\#}{0.4}. \quad (3)$$

Note that for an AWARE 2 system, θ=6.86°, α=9.6°, F/#=2.1, f=34 mm, fov=120°, which—when substituted into expression (3)—results in M≤0.88. while the actual value of M is 0.487.

By using first order optics calculations, the radius of objective lens R and the spacing d between microcamera and symmetrical center (center of objective lens) is inversely proportional to magnification M, which indicates that the system volume is proportional to $$\frac{1}{M^3}.$$

Following tills calculation, we would like to construct an MMS design having a small M and a small lens volume. However, according to equation (3), M cannot be arbitrarily small. If we now develop a coarse estimation for the volume limit of a conventional MMS design by using specifications of AWARE 2 in which:

$$d = \frac{f}{M - \frac{\alpha F/\#}{1.4}} \quad (4)$$

$$R = \frac{2(n-1)f}{Mn} \quad (5)$$

$$Lm = \frac{2f\alpha F/\#}{M^2} \quad (6)$$

$$V \approx \frac{2\pi}{3}(d + R + Lm)^3(1 - \cos(fov)) \quad (7)$$

where Lm in equation (6) denotes the optical track of a microcamera. If we assume an index of refraction of n=1.5. substitute into the specifications of AWARE 2 and further assume that M≤0.88. A derivation of Eqn. (7) is based on the conical shape of MMS cameras. This rough calculation indicates that a volume of an optical part V≥4.25×10⁻³ m³ for this conventional MMS camera.

Co-Boresighted MMS Lens Analysis

As noted, for a conventional, prior art MMS camera, the physical cone angle is smaller than MFOV resulting in a long optical track and overall more complex microcamera. According to aspects of the present disclosure, by interleaving several MMS cameras together, we to overcome this disadvantage.

Figure 3A:
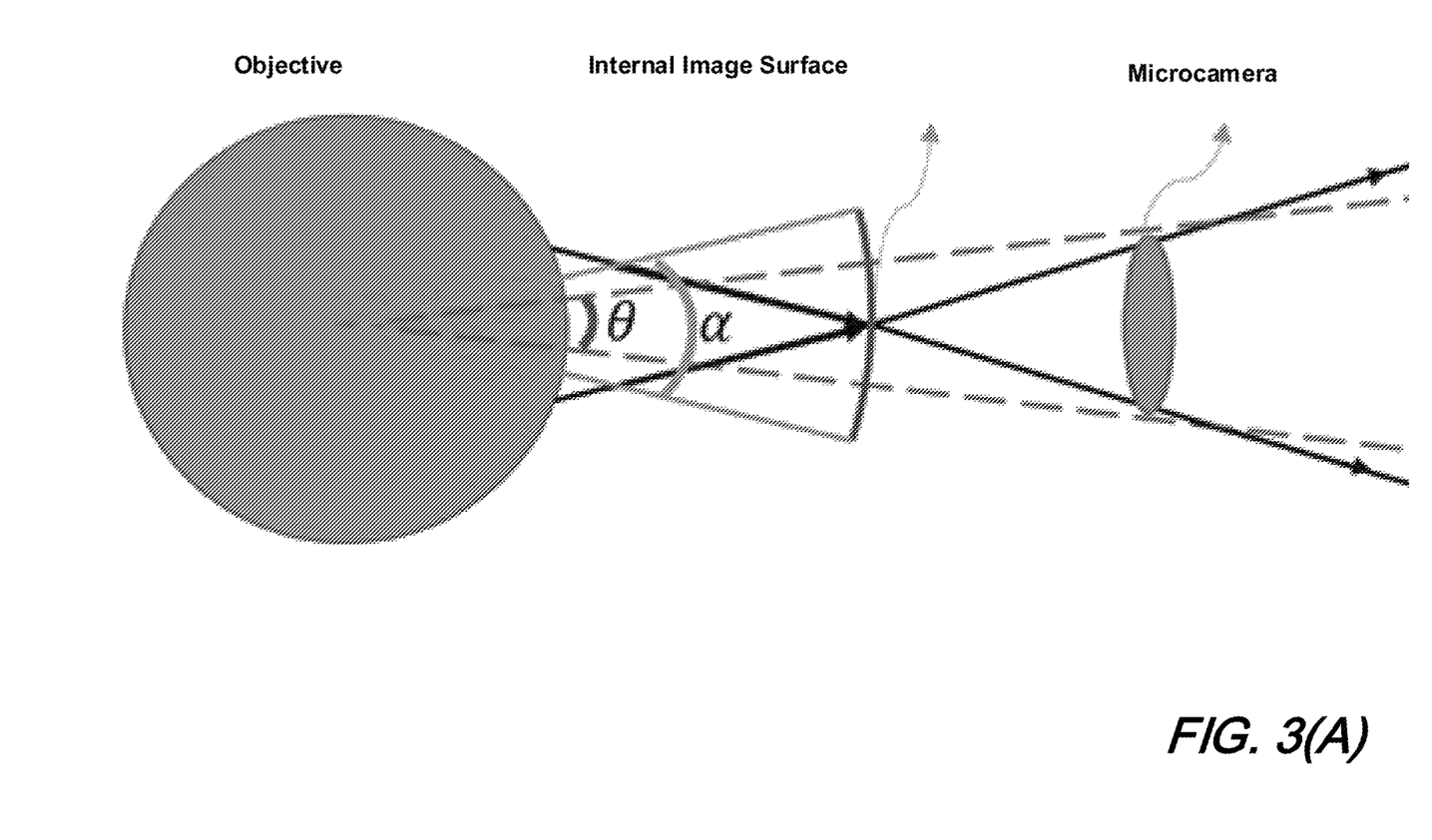
Figure 3B:
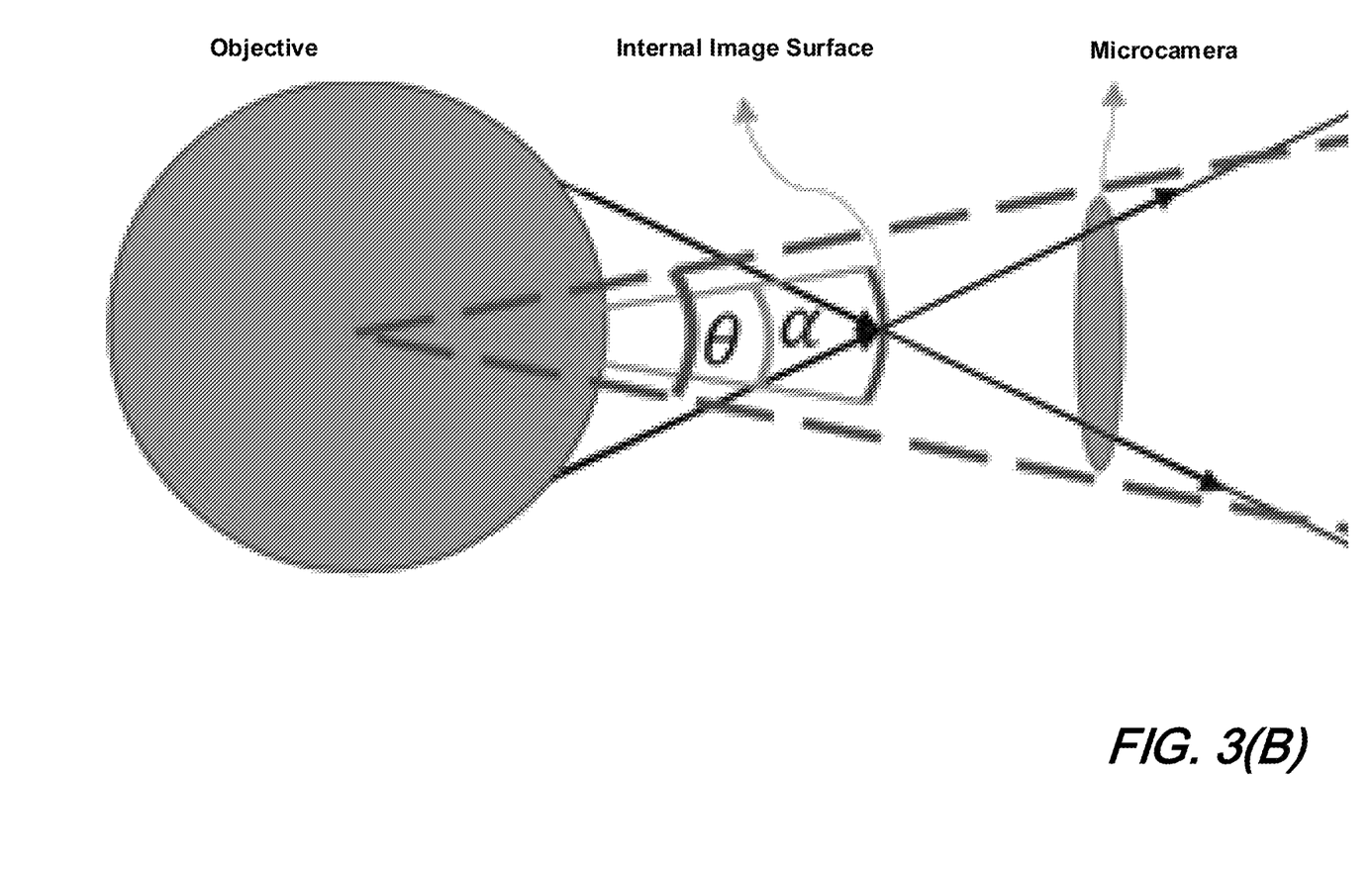
FIG. 3(B) illustrates a smaller optical volume.

FIGS. 3(A) and 3(B) show schematic diagrams of optical arrangements according to the present disclosure in which 3(B) illustratively shows a decreased optical volume. As noted above—for illustrative MMS imaging systems and cameras according to the present disclosure we parallel 3 specially configured MMS cameras together, in which each individual MMS camera has a complementary FOV with the other two individual MMS cameras—all arranged in a regular triangle pattern. Within each individual MMS camera, the physical cone angle is enlarged by $\sqrt{3}$, (note that if the number of paralleled camera is N, then the physical cone angle is enlarged by $\sqrt{N}$), $$\theta = \frac{\sqrt{3}\,\alpha}{1.4},$$

and there is no need for adjacent microcameras sharing overlapping FOV as any missing FOV vacancy(ies) will be filled by the other two cameras.

Following the same steps as presented before, we consider design potentials with regard to system volume and imaging performance. The basic geometry of an MMS lens does not change at all. Accordingly, the possible value of M is represented by the following relationship namely, $$M \le \frac{\sqrt{3}\,\alpha F/\#}{0.4} \tag{8}$$

For AWARE 2 specifications, we now have the new critical parameter limit $M \le 1.52$, which—when substituted into equations (4)-(8)—the new volume limit of optical part is determined to be represented by: $V \ge 1.33 \times 10^{-3}$ m$^3$. Notice that we have already multiplied right side of equation (8) by 3 to account for the three systems employed. Advantageously—and as compared with conventional MMS cameras—MMS imaging systems and cameras according to the present disclosure has reduced the overall physical size of optical part by more than 3 times!

Galilean Design in Co-Boresighted MMS Imaging Systems

As discussed previously—while it may result in a small (er) system volume—Galilean architecture leads to an unacceptable vignetting problem in conventional MMS design. Notwithstanding this vignetting problem—and according to further aspects of the present disclosure—by providing an ample space for each microcamera—co-boresighted MMS camera constructed according to the present disclosure advantageously enables the employment of Galilean architecture while eliminating the vignetting.

Figure 4A:
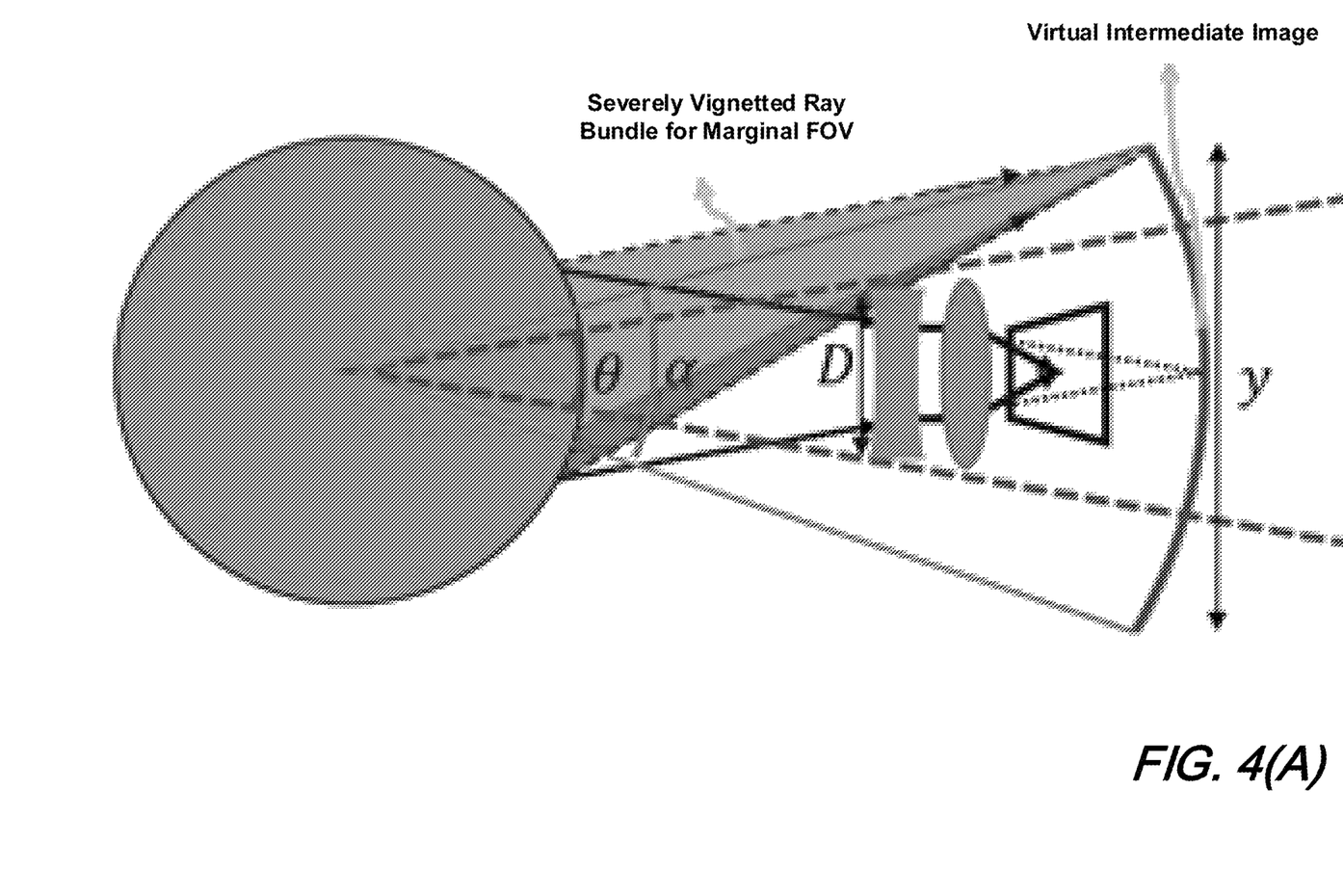
Figure 4B:
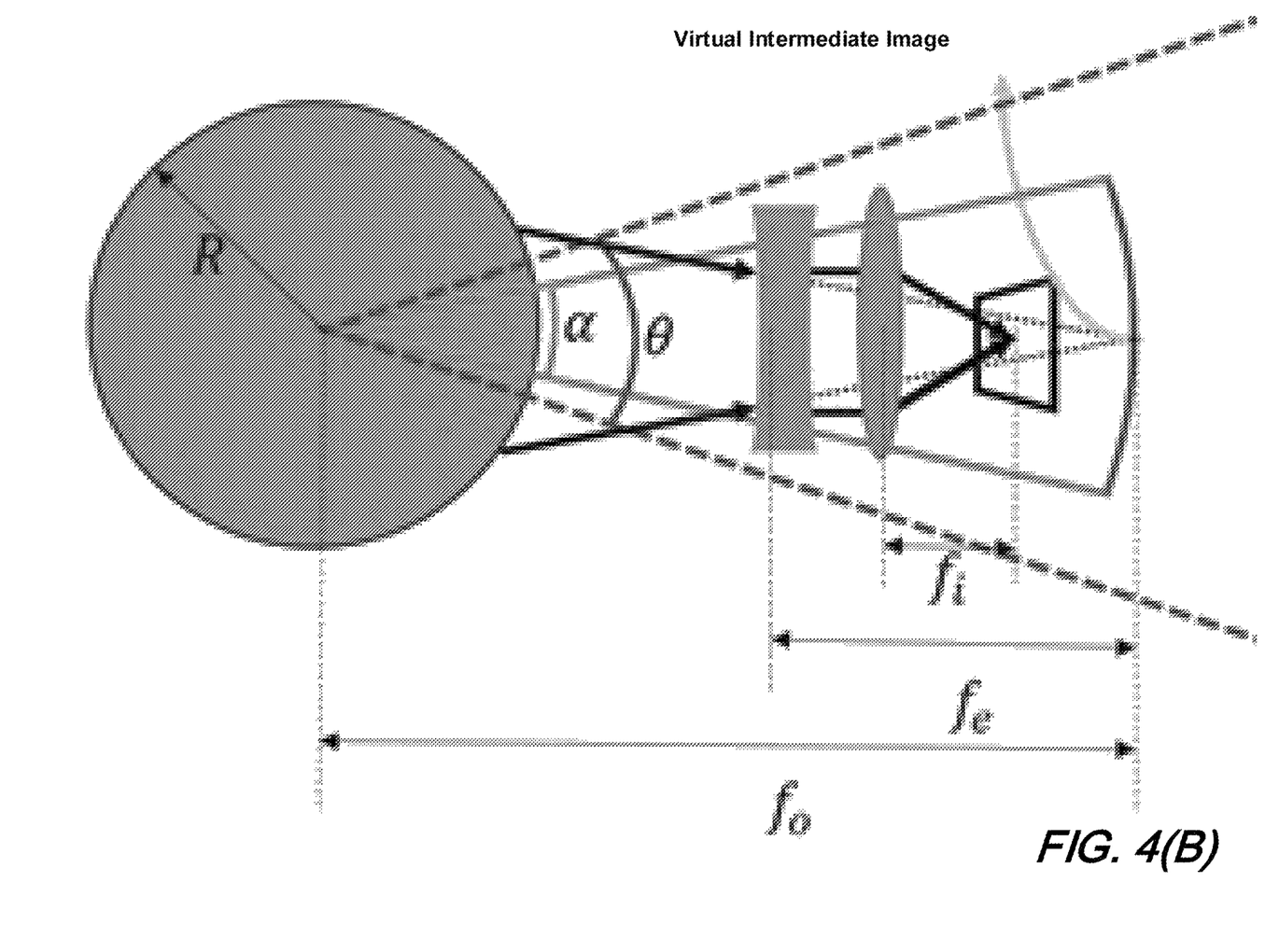
FIG. 4(B) shows an enlarged aperture of microcamera substantially reducing the dimension of the intermediate image overcomes such vignetting—according to the present disclosure.

FIGS. 4(A) and 4(B) show schematic diagrams of illustrative MMS optical imaging systems in which: FIG. 4(A) shows an aperture size of a microcamera being inherently smaller than virtual intermediate image for Galilean design such that a tiny portion of a ray bundle travels through the aperture while most of the ray bundle is blocked leading to severe vignetting and a marginal FOV while FIG. 4(B) shows an enlarged aperture of microcamera substantially reducing the dimension of the intermediate image overcomes such vignetting.

As shown in FIG. 4(A), for a conventional MMS imaging system, the aperture size of a microcamera is inherently smaller than virtual intermediate image for Galilean design, as only a tiny portion of ray bundle (shown) can travel through the aperture, while most of the ray bundle is stopped, which leads to severe vignetting and marginal FOV. In sharp comparison, structures according to the present disclosure advantageously solves this problem by enlarging aperture size of the microcamera substantially—while reducing the dimension of the intermediate image, as shown illustratively in FIG. 4(B). And while the microcamera in such configurations may exhibit a smaller F/# imaging ray bundle—which may add difficulty in correcting geometric aberrations—the benefit(s) of our architecture greatly overweighs any drawback(s).

System Volume Estimation

As previously noted, by employing a Galilean architecture and design, we may advantageously reduce overall volume of MMS Imaging systems and cameras even further. Using the calculations presented previously, we may determine an estimate of such beneficial reduced volume.

Figure 5:
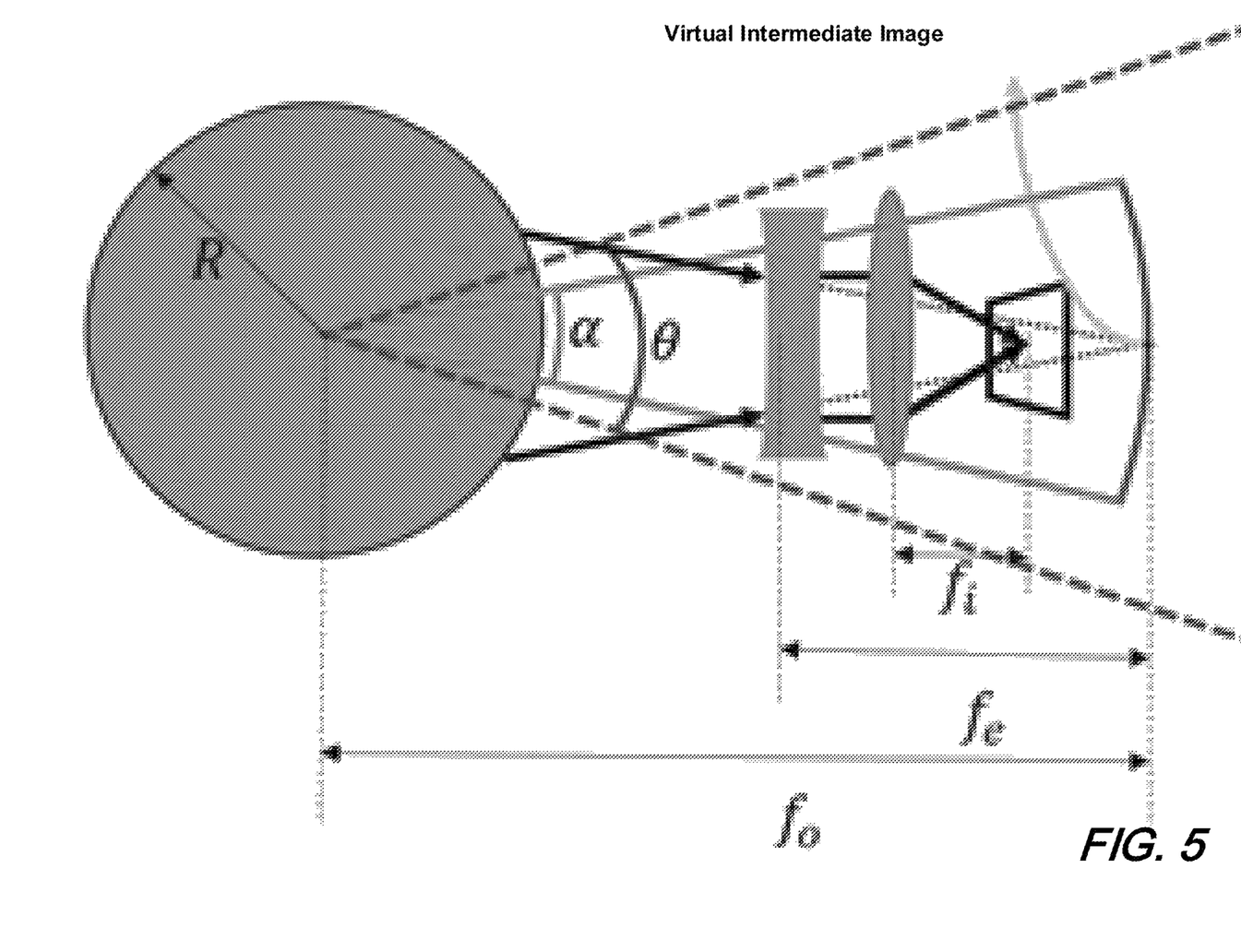
FIG. 5 shows a schematic diagram of an illustrative MMS optical imaging system according to an aspect of the present disclosure in which a reduction in longitudinal dimension results in a sharp decrease of overall volume for conical shaped cameras.

We note that since a Galilean telescope architecture shortens tube length from $f_o+f_e$ of a Keplerian telescope to $f_o-f_e$, such a shortened geometry results for MMS lens designs as well. As illustrated in FIG. 5—and according to an aspect of the present disclosure—this reduction in longitudinal dimension advantageously results in a sharp decrease of overall volume for conical shaped cameras.

With this principle in place, we note that for the specifications presented previously, the objective lens focal length is given by:

$$f_o = f/M_i;$$

the focal length of eyepiece is given by:

$$f_e = \frac{f\alpha F/\#}{M^2},;$$

while the focal length for imaging piece is given by:

$$f_i = \frac{f\alpha F/\#}{M}.$$

Combining all these calculations together, we obtain the longitudinal track as:

$$L = R + f_o - f_e + f_i,$$

and total volume of Galilean design can be computed from:

$$V \approx 2\pi L^3(1-\cos(\text{fov})).$$

Continuing with our analysis, if we apply the same magnification value $M < 1.52$, substituting in AWARE 2 parameters as before, the estimated low volume boundary of the optics is:

$$V \ge 3.90 \times 10^{-4}\ m^3.$$

Advantageously, such Galilean design results in a lower volume threshold another 3 times lower. Accordingly, by applying co-boresighted Galilean MMS optical design according to aspects of the present disclosure, the volume of a prior art AWARE 2 camera can be reduced to one tenth its reported size!

Imaging Quality and Lens Complexity Analysis

We may now compare—from imaging quality point of view—both Galilean architecture and Keplerian architecture with respect to MMS design potential. As will be known and understood by those skilled in the art, for a given design specification, certain lens structures are known to be superior as compared with other structures in terms of aberration correction, design time and lens complexity. For example, fisheye structures are applied for a wide FOV lens, a Double Gauss structure is particularly suited for fast F/# photographic lens and a telephoto structure is recognized as useful and therefore used as a long focal length lens.

As is known, since aberrations have a major effect on imaging system, they can be used to analyze the design potential of a lens structure. Known measurements include Seidel coefficients which can provide a great evaluation of system aberrations. Commonly used aberration terms of measurement include spherical aberration, coma and astigmatism—these latter two particularly relevant for a FOV far away from an axis. In the current application of MMS imaging systems and cameras, since each microcamera exhibits only a relatively narrow FOV, we only consider the spherical aberration herein.

It is worth noting that these Seidel aberrations are highly correlated with each other, for instance, well corrected spherical aberration often indicates a minor coma and astigmatism and can be perceived from their related formulas. The Seidel spherical aberration coefficient is defined by:

$$S^{(1)} = -\Sigma_{i=1}^{N} A_i^2 h_i Q_i,$$

which is summation over N surfaces of optical system. On each surface, $A_i$ is refraction invariant of marginal ray, $h_i$ is ray height and $Q_i$ is aplanatic deviation.

As will be appreciated by those skilled in the art, in order to minimize spherical aberration, one either minimizes this coefficient on each individual surface, or cancels them on summation together, and usually uses both strategies. However, the latter strategy requires that coefficients from different surfaces change sign, actually, only aplanatic deviation $Q_i$ changes sign when the system combines lenses of positive power and negative power.

Figure 6A:
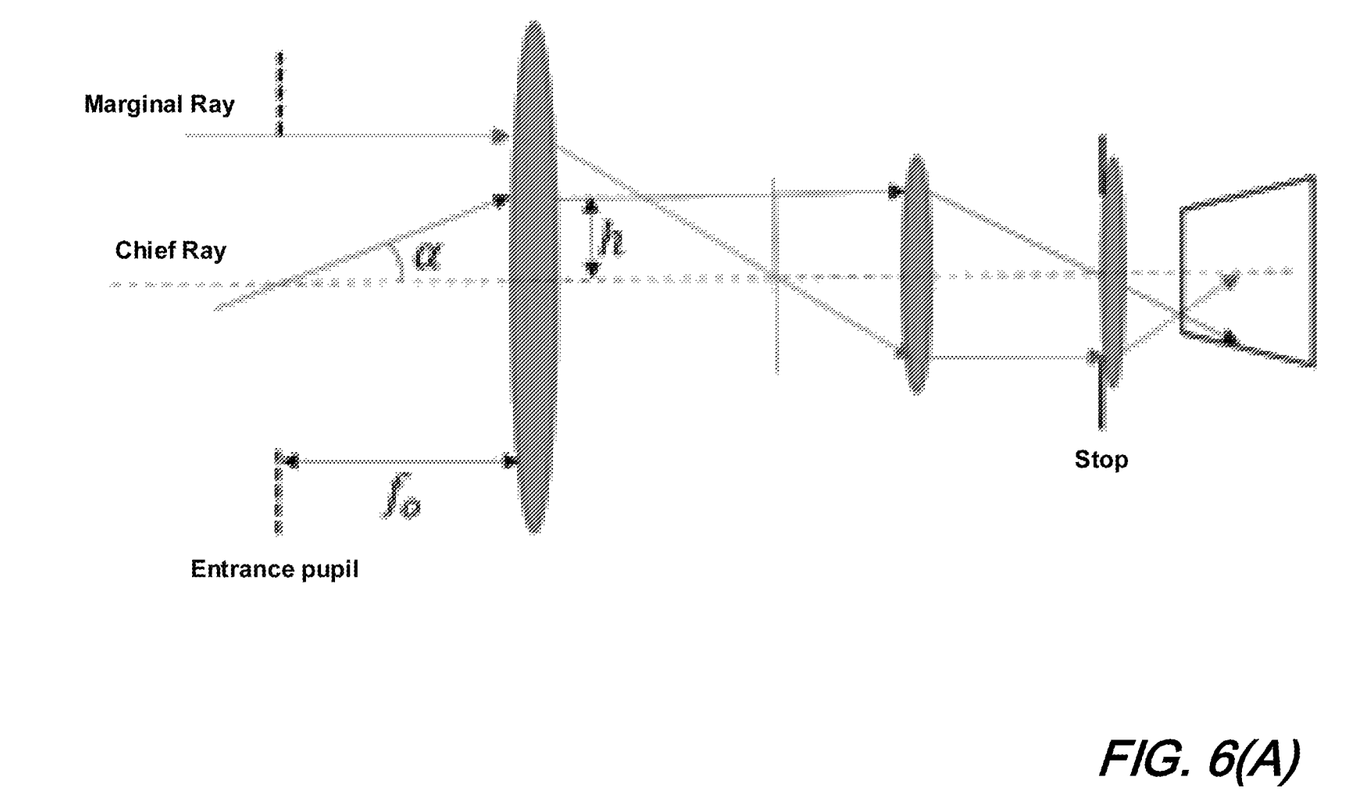
Figure 6B:
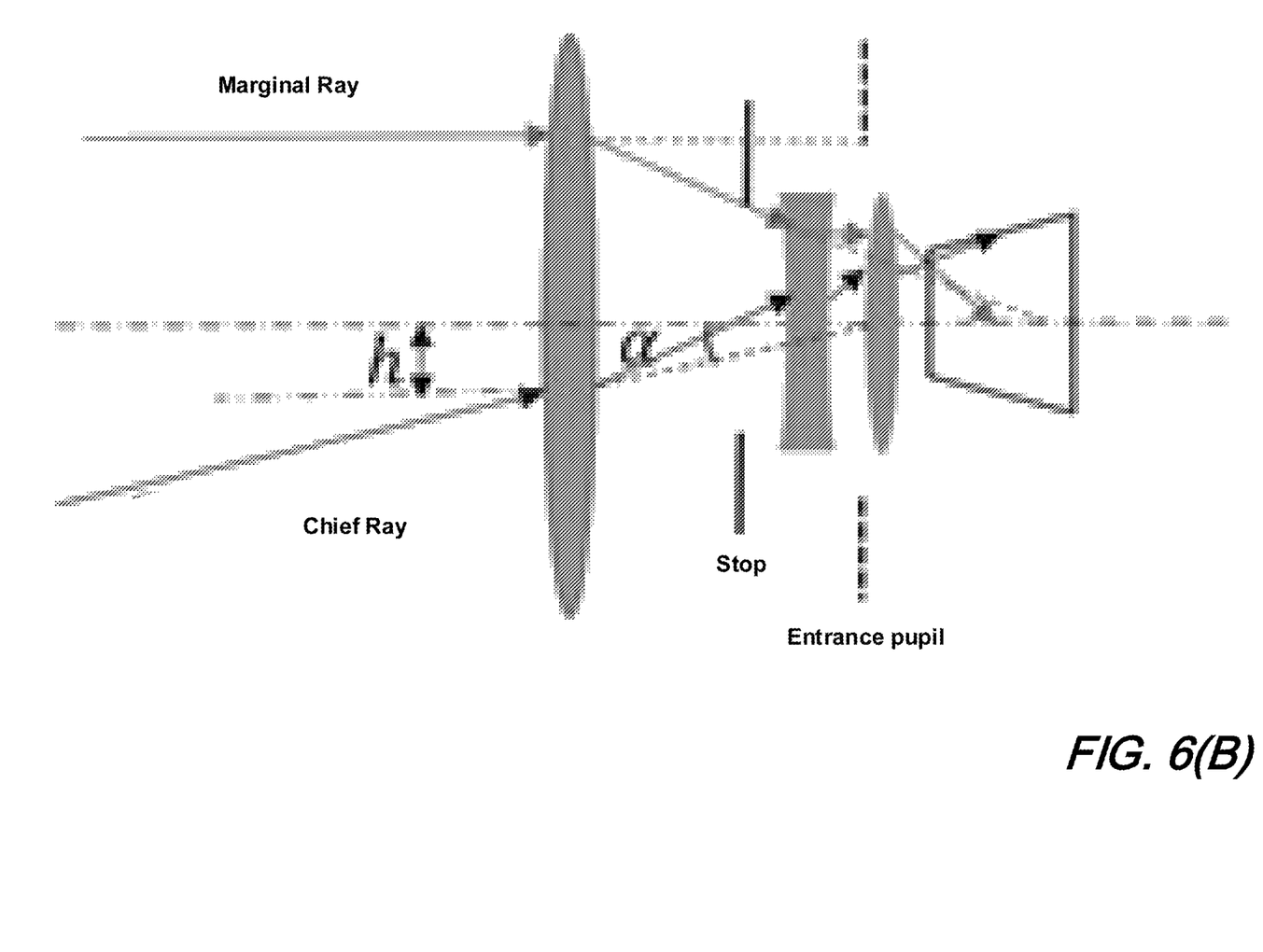
FIG. 6(B) shows an illustrative schematic of a Gallerian design according to an aspect of the present disclosure.

As illustrated in FIG. 6(A), since a Keplerian design consists of three positive lens groups, it is difficult for one group to compensate for spherical aberration from other groups. In contrast, the eyepiece group in Galilean style shown in FIG. 6(B) has a negative power and consequently may be designed to cancel aberrations from the other two groups. In addition, the Galilean design is more flexible with respect to the placement of a stop position. More particularly, we may advantageously shift the stop towards the objective lens to strike a balance on chief ray height between objective lens and eyepiece, which may advantageously minimize comma, distortion and other chief ray parameter related aberrations. Keplerian designs are incapable of such adjustment without significantly changing other part(s) of its elements.

Design Example

At this point we may now show illustrative design examples verify our inventive arrangements and architectures. To facilitate a convenient comparison, we have applied the same specifications of a glass version AWARE-2 camera. Based on an Aptina MT9F002 14 megapixel monochrome CMOS sensor with a 4384×3288 array of 1.4 µm pixels, the glass version AWARE-2 camera exhibits F/3 and an angular resolution of 56 µrad image which requires an effective focal length of 25 mm. By way of comparison, we show a design employing the co-boresighted Galilean principles according to aspects of the present disclosure.

Figure 7:
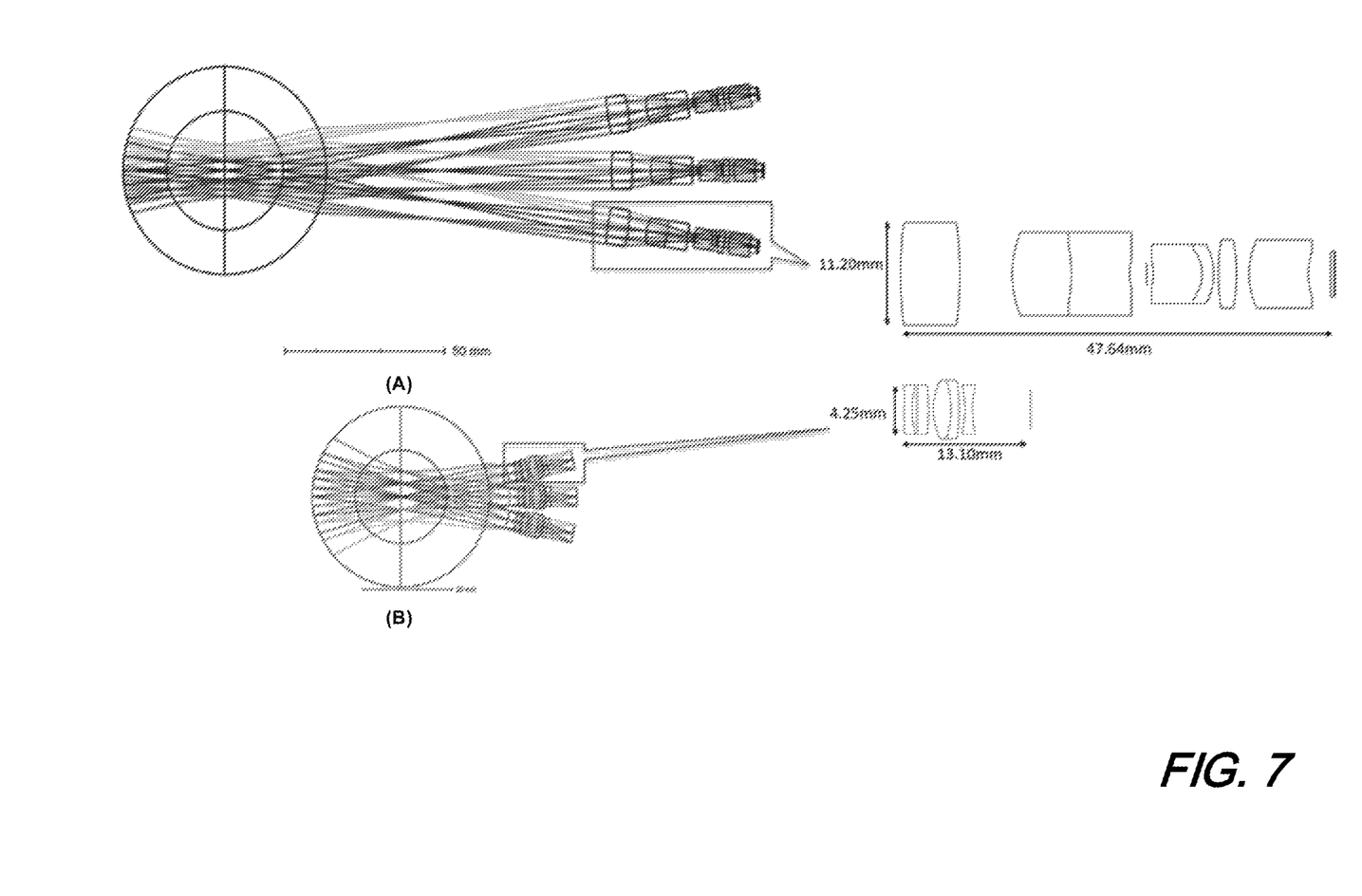

FIGS. 7(A) and 7(B) show schematic diagrams of illustrative optical configurations in which FIG. 7(A) illustrates the AWARE-2 design and FIG. 7(B) illustrates a co-boresighted, Galilean MMS according to aspects of the present disclosure. Also shown in that figure are exploded views of lens configurations used in each. As will be readily apparent by inspection, the FIG. 7(B) design of the present disclosure exhibits a substantially lower volume than the FIG. 7(A) design.

We note once more that Galilean architectures according to the present disclosure generally include three optical groups, an objective lens, a sensor optic, and an eyepiece interposed therebetween. As noted, the objective is illustratively a layered monocentric lens in which each layer is constructed from a substantially homogeneous material. Secondary optics are arrayed on a spherical surface concentric with the objective. A Galilean eyepiece is a negative power group displaced from the center of the objective by the sum of the objective and eyepiece focal lengths. Conventionally, a stop aperture is positioned at the eyepiece to facilitate easy observation. Such stop position results in reduced spherical symmetry and thus may create local aberrations. Advantageously—and according to an aspect of the present disclosure, such stop position may be relocated to strike a design balance between aperture size of the objective lens and the microcamera array and to adjust any aberration.

As may be observed from that figure, the monocentric objective is a two layered spherical ball lens made of S-NBH8 glass and fused silica, which are the same materials used in AWARE-2 system. The focal length of the objective is 47.68 mm with a radius of curvature 20 mm for the outer shell and 10.33 mm for the inner yolk. In contrast, the outer and inner radii of AWARE-2 system is 31.80 mm and 18.19 mm. By simple calculation, the magnification value M here is 0.52 compared with 0.37 used in the glass version AWARE-2. The microcameras here use only 5 spherical glass elements with one cemented doublet and all materials are selected from commercial suppliers as compared with 7 optical elements with a two piece doublet for AWARE-2 system. As may be further observed, the aperture diameter of the microcamera according to the present disclosure is advantageously reduced to 4.25 mm and the optical track is reduced to 13.10 mm as compared with 11.20 nm diameter and 47.64 mm optical track employed in AWARE-2 microcameras. Further emphasizing the volume difference and advantages of systems according to the present disclosure, the optical track length of the entire system is only 59.64 mm, while the AWARE-2 system exhibits a 200.32 mm optical track length. Taken all together, our innovative design according to the present disclosure illustratively exhibits a volume of only $1.22 \times 10^{-3}$ m$^3$ as compared with $1.53 \times 10^{-2}$ m$^3$ of the AWARE-2 system—a reduction of almost one order of magnitude!

Figure 8A:
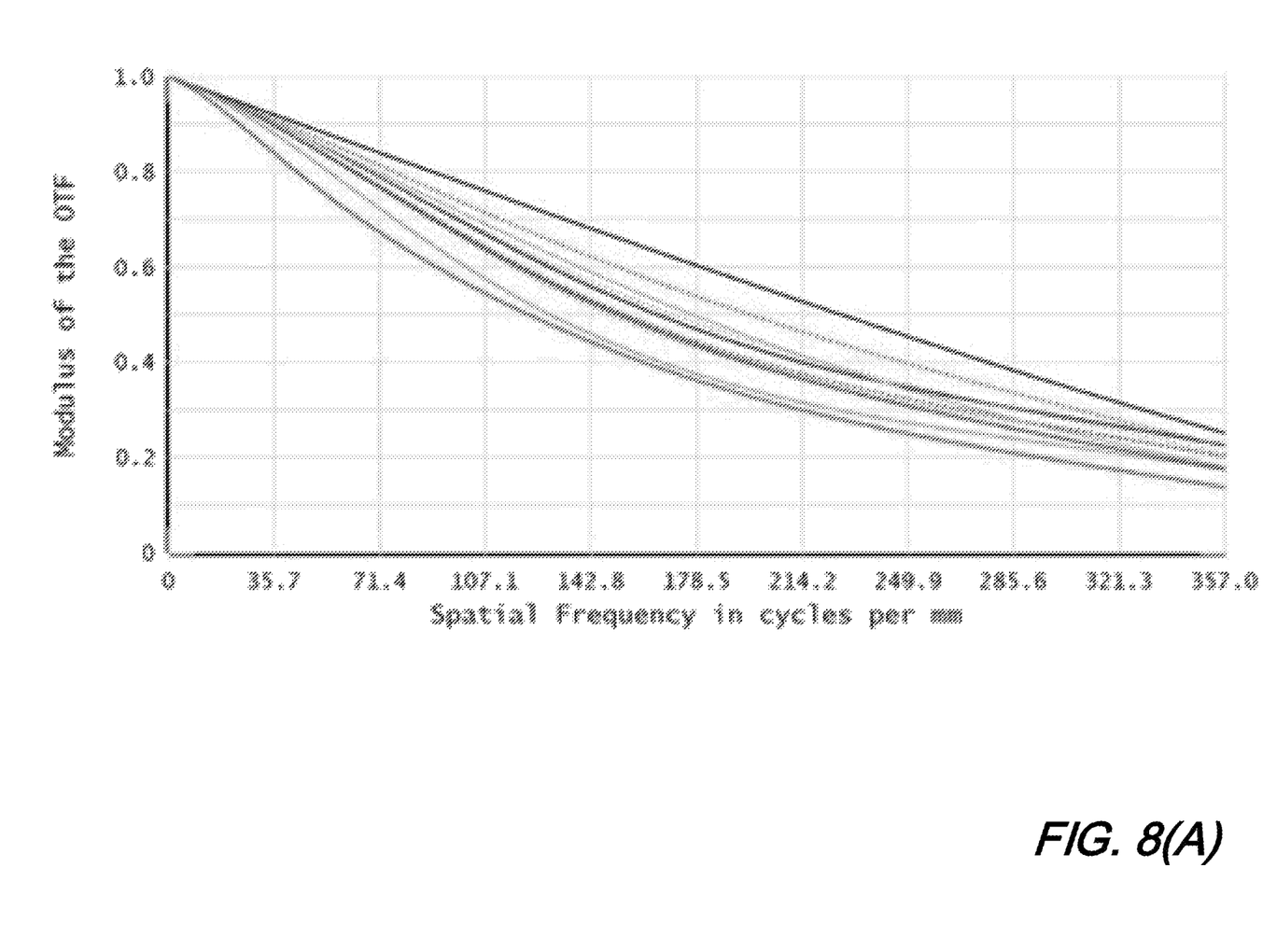
Figure 8B:
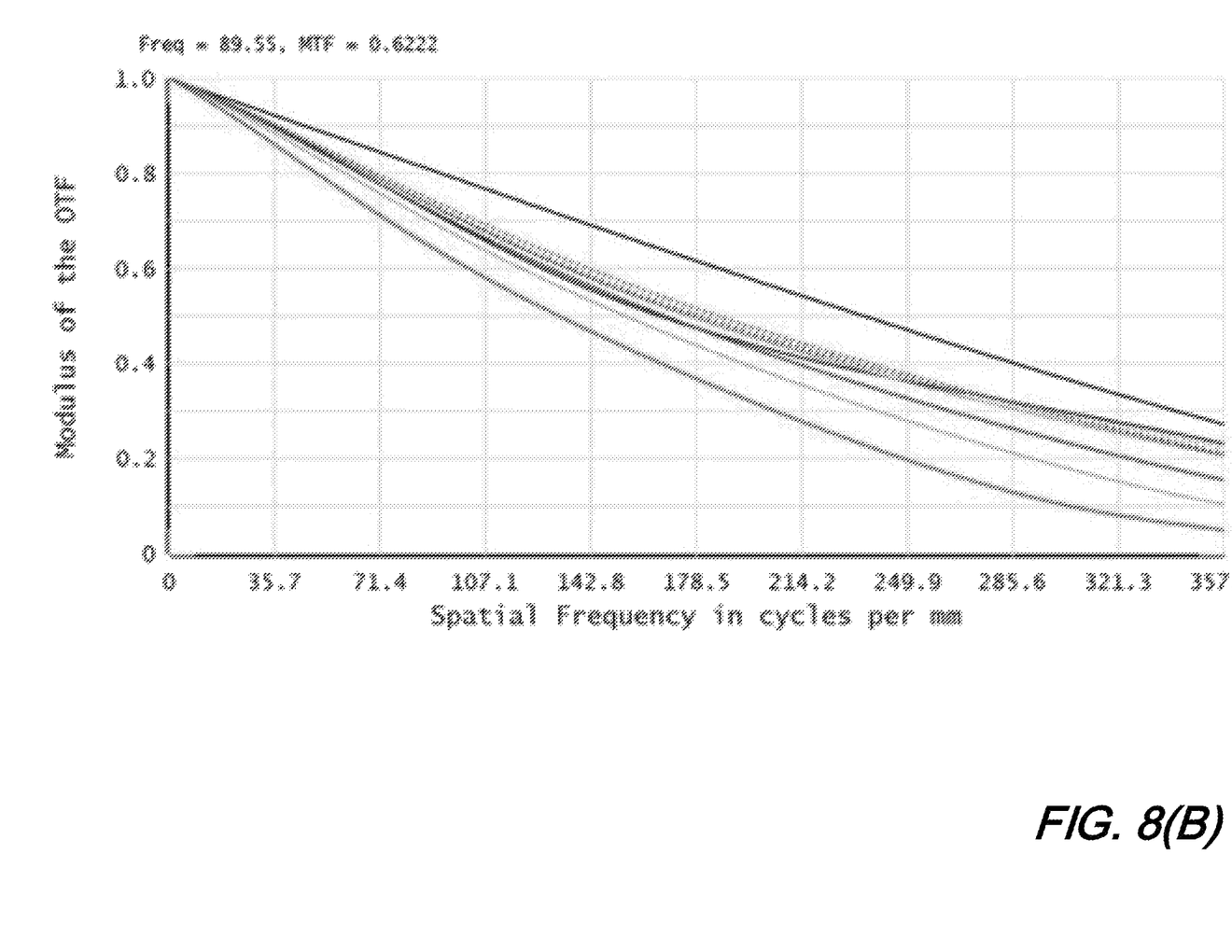

In addition to improved system compactness, MMS design(s) according to the present disclosure exhibit superior imaging performance. We compare the nominal performance of two designs here using modulation transfer function (MTF) as shown in FIGS. 8(A) and 8(B). The MTF of a design according to the present disclosure exhibits nearly diffraction-limited performance out to 4.8° off-axis FOV as depicted in FIG. 8(A). In contrast, the MTF of a glass version AWARE-2 falls slightly for marczinal FOV on 357 cycles per mm, which is the Nyquist sampling resolution of the sensor. In the same time, designs according to the present disclosure exhibit no vignetting over the whole field while the AWARE-2 design suffers 64% tangential vignetting for marginal FOV. Finally, we note that designs according to the present disclosure exhibit superior tolerance(s), despite its dramatic reduction in physical size.

CONCLUSION

We have devised a new approach for MMS system. By applying several co-boresighted MMS lenses which complement each other by interleaving a complete FOV, we have basically liberated microcameras from ultra-tight budget for space. Under this strategy, the microcamera array achieves high image quality without physical interference. Of further advantage, the physical size of the monocentric objective can also be reduced Which is results in a greater magnification number M between final image and intermediate image. What is particularly significant, this design methodology according to the present disclosure any tight space "tension" among microcameras, at the same time, also advantageously decreases overall system volume. As will be readily appreciated by those skilled in the art—for the conventional MMS system, for instance, an AWARE-2 camera, some level of vignetting on marginal FOV is allowed to avoid physical interference, which causes unevenness on image illumination and fall off of MTF. Advantageously this characteristic problem is overcome by the new design methodology according to the present disclosure.

In addition to the advantages mentioned above, we again reiterate that our co-boresighted method according to the present disclosure which exhibits a Galilean architecture—results in a shorter) optical total track and superior aberration characteristics as compared with Keplerian architectures of the prior art. Finally, we show an illustrative design example and demonstrate that co-boresighted Galilean style MMS methodology according to the present disclosure has advantageously produced a design exhibiting a smaller volume by more than one order of magnitude than that of conventional MMS, as well as superior imaging quality.

At this point, those skilled in the art will readily appreciate that while the methods, techniques, and structures according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. A monocentric multiscale optical system CHARACTERIZED BY:
    a Galilean architecture having at least three individual microcameras, each microcamera configured to produce a respective subimage, wherein subimages produced by adjacent ones of microcameras do not overlap; and
    three optical groups including an objective lens, a sensor optic, and an eyepiece interposed between the objective and the sensor optic, wherein the sensor optic is positioned immediately adjacent to the eyepiece such that the diameter of the sensor optic is equal to the diameter of the eyepiece.

2. The monocentric multiscale optical system of claim 1 further CHARACTERIZED BY:
    the objective lens exhibits a positive optical power, and the eyepiece exhibits a negative optical power.

3. The monocentric multiscale optical system of claim 2 further CHARACTERIZED BY:
    the eyepiece is positioned at a location from the center of the objective by an amount equal to the sum of the objective and eyepiece focal lengths.

4. A monocentric multiscale optical system CHARACTERIZED BY:
    a Galilean architecture having at least three individual microcameras, each microcamera configured to produce a respective subimage, wherein subimages produced by adjacent ones of microcameras do not overlap; and
    three optical groups including an objective lens, a sensor optic, and an eyepiece interposed between the objective and the sensor optic, wherein the objective lens exhibits a positive optical power, and the eyepiece exhibits a negative optical power, and wherein the eyepiece is positioned at a location from the center of the objective by an amount equal to the sum of the objective and eyepiece focal lengths.

* * * * *